United States Patent [19]
Cronin

[11] Patent Number: 6,147,563
[45] Date of Patent: Nov. 14, 2000

[54] COUPLED CAVITY OSCILLATOR PRODUCING OUTPUT SIGNALS WITH A CONSTANT PHASE DIFFERENCE

[75] Inventor: Dennis Lee Cronin, Garner, N.C.

[73] Assignee: Channel Master LLC., Smithfield, N.C.

[21] Appl. No.: 09/502,529

[22] Filed: Feb. 10, 2000

Related U.S. Application Data

[62] Division of application No. 09/119,307, Jul. 20, 1998.

[51] Int. Cl.[7] ............................... H03B 5/18; H03B 9/14; H04L 27/20
[52] U.S. Cl. ............................. 331/55; 331/56; 331/101; 331/107 C; 331/107 P; 331/107 G; 332/105; 375/279; 375/308
[58] Field of Search ............................... 331/55, 96, 101, 331/107 DP, 107 P, 107 C, 107 G; 332/103, 105; 375/279, 308

[56] References Cited

U.S. PATENT DOCUMENTS

| | | | |
|---|---|---|---|
| 3,691,479 | 9/1972 | Malcolm | 331/107 G |
| 4,551,689 | 11/1985 | Scala et al. | 331/2 |
| 4,573,213 | 2/1986 | Dixon, Jr. et al. | 331/107 G |
| 4,763,085 | 8/1988 | Lamberg | 331/56 |
| 4,896,123 | 1/1990 | Taub | 332/103 |
| 4,959,654 | 9/1990 | Bjorke et al. | 342/120 |
| 5,748,679 | 5/1998 | Finkenbeiner et al. | 375/305 |

*Primary Examiner*—Siegfried H. Grimm
*Attorney, Agent, or Firm*—Darby & Darby

[57] ABSTRACT

An improved method and system for generating quadrature phase shift keying signals for use in data transmission is provided. A pair of oscillators are slaved to the transmit frequency and produce two quadrature signal components with the same frequency but 90 degrees out of phase. The two signal components are carried to separate bi-phase switches by mirrored waveguides. Each bi-phase switch has a reflective waveguide coupler which directs the received signal into a waveguide terminated by a hard short and has a controllable shorting plane spaced approximately one-quarter wavelength from the termination point. The shorting planes are controlled by the output data signals and each introduces a 180 degree phase shift in the respective signal component when activated. The reflective couplers direct the selectively phase shifted signal components to an in-phase combiner, where they are combined to produce the quadrature phase shift keyed output signal.

5 Claims, 5 Drawing Sheets

COUPLED CAVITY OSCILLATOR PRODUCING OUTPUT SIGNALS WITH A CONSTANT PHASE DIFFERENCE

This is a division, of application Ser. No. 09/119,307, filed Jul. 20, 1998. Each of these prior applications is hereby incorporated herein by reference, in its entirety.

TECHNICAL FIELD

This invention is related to a high frequency transmitter. More particularly, this invention relates to a high frequency quadrature phase shift keying transmitter implemented in a waveguide.

BACKGROUND OF THE INVENTION

Evolving high frequency communications technologies operating from around 27 GHz to 31 GHz are generally full-duplex in nature and are deployed in terrestrial microcells or configured to directly exchange data with low earth orbit satellites. Service providers typically divide the allocated transmit and receive frequency spectrums so that the transmitter in the satellite or base station operates in a lower, and therefore easier to work with, frequency block of around 27 GHz while the transmitter in the consumer's device operates at the higher frequency, e.g. 31 GHz.

FIG. 1 is a high level diagram of a conventional quadrature phase shift keying (QPSK) transmitter 10 used to transmit at around 31 GHz. The transmitter consists of a channel oscillator 11 operating at an intermediate frequency (IF), e.g., 1 GHz, which feeds a quadrature divider 12 that produces two output signals having a relative phase difference of 90 degrees. These signals are provided to separate bi-phase modulator switches 13, 14 which output either the original input signal, or the input signal phase shifted by 180 degrees, depending on the value of a respective input data bit 15, 16. Thus, the first modulator 13 will produce an output signal with a phase of 0 degrees or 180 degrees and the second modulator 14 will produce a signal with a phase of 90 degrees or 270 degrees, according to the value of the input data bits 15, 16. The output signals of the modulator switches are mixed with an in-phase combiner 17 to produce a four vector output signal 18.

The intermediate frequency QPSK signal 18 is input to a preamplifier 19 via a coaxial cable. The amplified signal is processed by an image filter 20 to reduce noise and then combined with a signal from a local high frequency oscillator 21 operating at the transmit frequency, e.g., 31 GHz, with a mixer 22. A local trap 23 may also be utilized to clip out emissions outside a particular bandwidth in order to comply with applicable government regulations. The final signal is then input to the transmit amplifier 24.

It is very difficult to economically generate enough power at 31 GHz to uplink a signal to a satellite or base station. A conventional solid state 31 GHz transmit amplifier is produced as a thin film integrated circuit using GaAs technology. Devices of this type which are powerful enough to produce a one-watt output signal typically cost several thousand dollars each. The high cost of the amplifier places the total cost of the transceiver unit, which includes a transmitter, a receiver, an antenna, and the equipment housing, well beyond the price range of most interested consumers.

Accordingly, it is an object of the invention to provide a high power transmit block for consumer satellite uplinks which may be inexpensively manufactured.

It is a further object of the invention to provide a high frequency transmitter which eliminates the need to internally generate a modulated signal at an intermediate frequency before producing the high frequency output signal.

Yet another object of the invention is to provide a high frequency QPSK transmitter block in which the signal modulation is implemented in a waveguide.

SUMMARY OF THE INVENTION

According to the invention, two Gunn diode cavity oscillators are employed as a quadrature signal source. The cavity oscillators are configured to operate at the transmit frequency, e.g., 31 GHz. The first oscillator is driven by steering voltage which is generated by a phase locked loop. A feedback path from the first oscillator to the PLL is provided to maintain the oscillation phase. The second cavity oscillator is slaved to the first at a specified phase vector, preferably by magnetically linking the oscillators through integral wall apertures designed to ensure a frequency coherence between the two oscillators while maintaining the specified phase vector over the entire normal frequency bandwidth of the devices. Each cavity oscillator is coupled to a waveguide to produce an output signal. The coupling point is selected so that the output signals, i.e., quadrature vectors, are 90 degrees out of phase with each other.

The quadrature vectors are presented to a mirrored pair of bi-phase, solid-state switches realized in a waveguide. Each switch is preferably comprised of a magnetic reflective coupling structure which can be switched according to the value of an input data bit between a hard-wall wave guide short and a compensated, electrically generated shorting plane, such as a diode placed within the waveguide. The distance between the switchable shorting plane and the hard-wall short is selected to produce a switchable net phase change of 180 degrees. The waveguide output from each bi-phase switch is connected to an in-phase combiner to yield a combined QPSK signal that can be applied directly to an antenna.

Accordingly, the present invention allows the generation and combination of two quadrature signal sources, each independently bi-phased switched, in a waveguide system which accepts input data directly and produces a QPSK output signal at the transmit frequency without needing an intermediate frequency stage. Further, the transmitter of the present invention eliminates the majority of components of a conventional transmitter. In particular, the power for the output signal is supplied directly from the cavity oscillators and coupled to the transmitter output through efficient waveguide structures. Therefore, separate high frequency signal amplifiers are not required.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
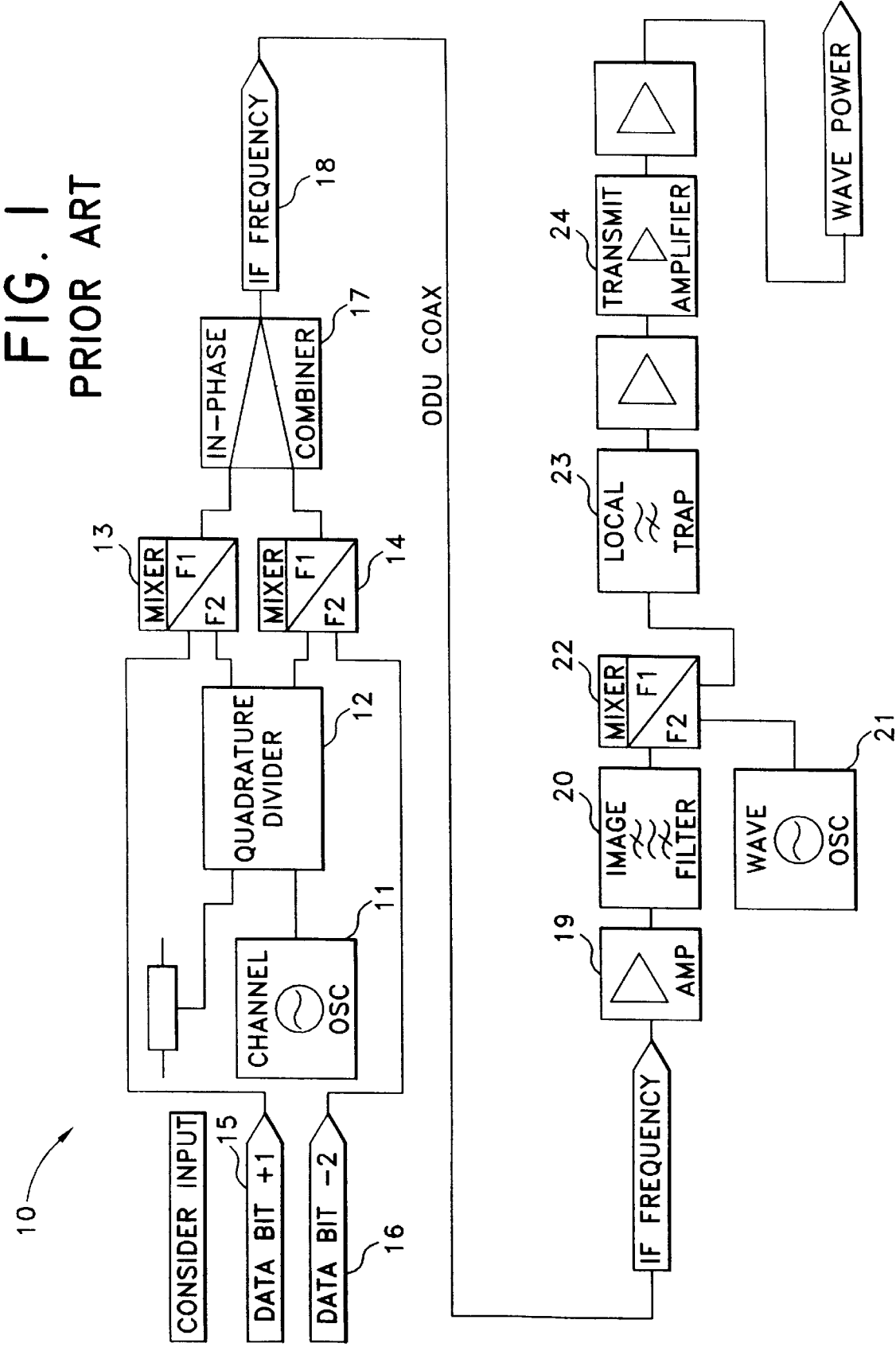
FIG. 1 is a block diagram of a conventional high frequency QPSK transmitter.
Figure 2:
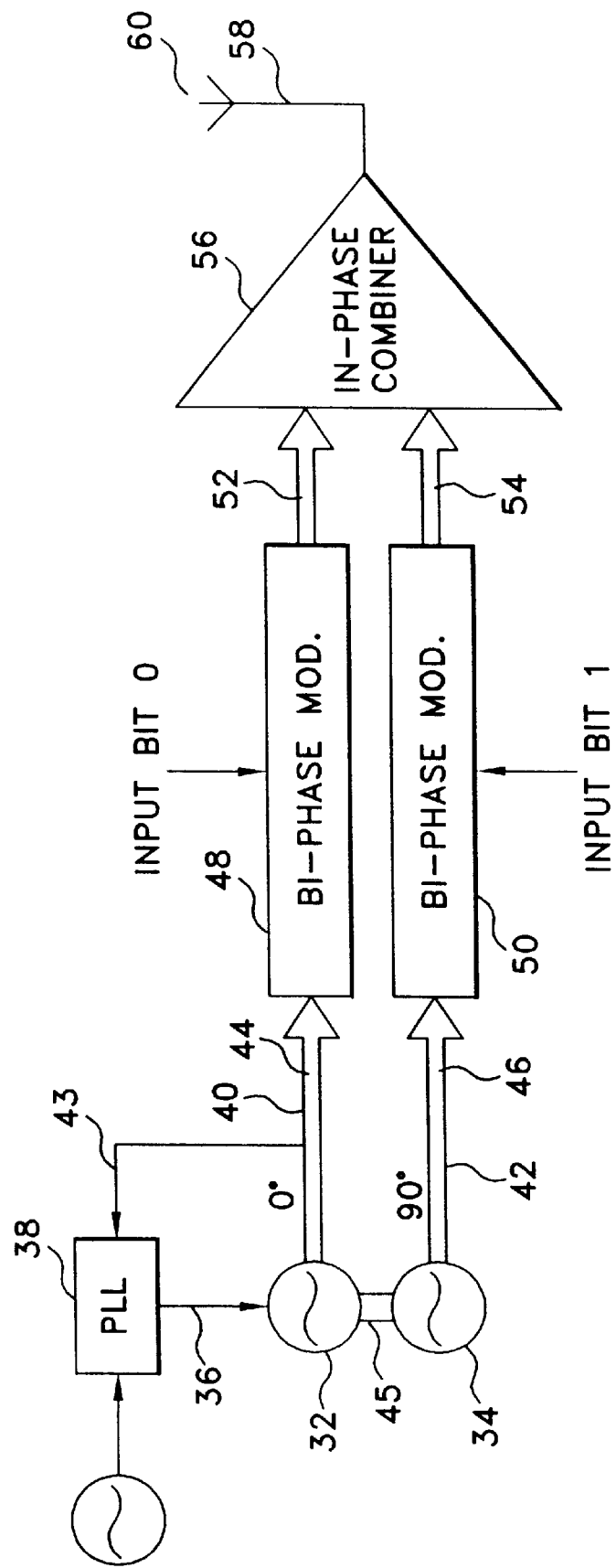
FIG. 2 is a block diagram of a high frequency QPSK transmitter according to the present invention.

Turning to FIG. 2, there shown is a block diagram of a high frequency QPSK transmitter 30 according to the present invention. Two Gunn diode cavity oscillators 32, 34 are each configured to operate at the transmit frequency, e.g., 31 GHz. The first oscillator 32 is phase locked to the selected channel frequency and produces an output signal in waveguide 40.

Preferably, locking is accomplished by applying a steering voltage 36 to the oscillator 32. The steering voltage 36 is generated by a phase locked loop ("PLL") 38 which preferably operates at only a fraction of the selected cavity oscillation frequency. A feedback path 43 taps the signal in waveguide 40 and provides it to the PLL 38 to maintain the oscillation phase.

The second cavity oscillator 34 is connected to the first oscillator 32 in a manner which slaves the oscillation of the second oscillator 34 to the first oscillator 32. In the preferred embodiment, the second oscillator 32 is magnetically linked to the first oscillator 32 at a specified phase vector through integral wall slots and a coupling aperture 45. This arrangement permits synchronizing energy from the first oscillator 32 to travel into the second oscillator 34 where it functions as a steering signal which synchronizes the phase and frequency of oscillation of second oscillator 34 to that of the first oscillator 32. Thus, the two oscillators can be controlled from a single adjustment point. Preferably, the slots and aperture 45 are designed to ensure a frequency coherence between the two cavity oscillators 32, 34, while maintaining a specified phase vector between the oscillators 32, 34 over the entire normal frequency bandwidth of the devices.

Other slaving arrangements known to those of skill in the art may also be used. For example, the steering voltage 36 from PLL 38 may be used to drive the second oscillator 34. Alternatively, another PLL may be utilized to drive the second oscillator 34, which PLL is synchronized to the first PLL 38.

Each cavity oscillator 32, 34 is coupled to a respective output waveguide 40, 42 to supply an output vector 44, 46. The oscillators 32, 34 preferably have a cavity configuration which provides for output voltage signals 44, 46 extracted at different points to have different phases. By selecting different extraction points for two oscillators 32, 34, the output signals 44, 46 will be out of phase. The coupling points between the output waveguides 40, 42 and the oscillators 32, 34 are selected so that the two output vectors 44, 46 are 90 degrees out of phase with each other. The extraction points may be adjusted as required to compensate for any phase differences introduced by the coupling method. According to the invention, these output signals are employed as a quadrature signal source.

Each quadrature vector 44, 46 is presented to a bi-phase, solid-state switch 48, 50. The configuration of the waveguides 40, 42 between the oscillators 32, 34 and the switches 48, 50 is chosen so that the waveguides 40, 42 have substantially the same electromagnetic transmission characteristics so that any phase shifts which are introduced are introduced equivalently to the generated signals 44 and 46. This preserves the phase relationship between the two signals in a manner which is independent of the frequency of oscillation. Preferably, the waveguides 40, 42 are substantially symmetrically identical, i.e., they have substantially the same shape, or are rotations and/or mirrored versions of each other, so that generated signals 44, 46 travel the same distance along the same shape of path.

According to the invention, each bi-phase switch 48, 50 is realized in a waveguide and is comprised of a magnetic reflective coupling structure connected to a waveguide which can be switched according to the value of an input data bit between a hard-wall wave guide short and one or more compensated, electrically generated shorting planes. The distance between the switchable shorting planes and the hard-wall short is selected to produce a switchable net phase change of 180 degrees, taking into consideration any phase shift introduced by the parasitic capacitance of the shorting switch in the off state. Thus, the output 52 of the first bi-phase switch 48 will have a phase of either zero or 180 degrees and the output 54 of the second bi-phase switch 50 will have a phase of either 90 degrees or 270 degrees, depending on the states of the switches 48, 50 as selected by the input data.

The output vectors from switches 48, 50 are passed through waveguides 52, 54 which are connected to a conventional in-phase combiner 56. The combiner 56 produces a combined QPSK signal 58 which can be applied directly to a broadcast antenna 60.

According to the invention, virtually the entire signal path between the oscillators and the antenna is a waveguide structure. There are no intermediate stages in which the signal is converted from one frequency to another. Instead, the signals originally generated by the oscillators 32, 34 are the ones which are ultimately output and transmitted. A significant advantage of this arrangement is that the output power of the transmitter 30 is supplied directly from the oscillators 32, 34 and limited only by the efficiency with which the signals are passed by the waveguide structures.

Figure 3A:
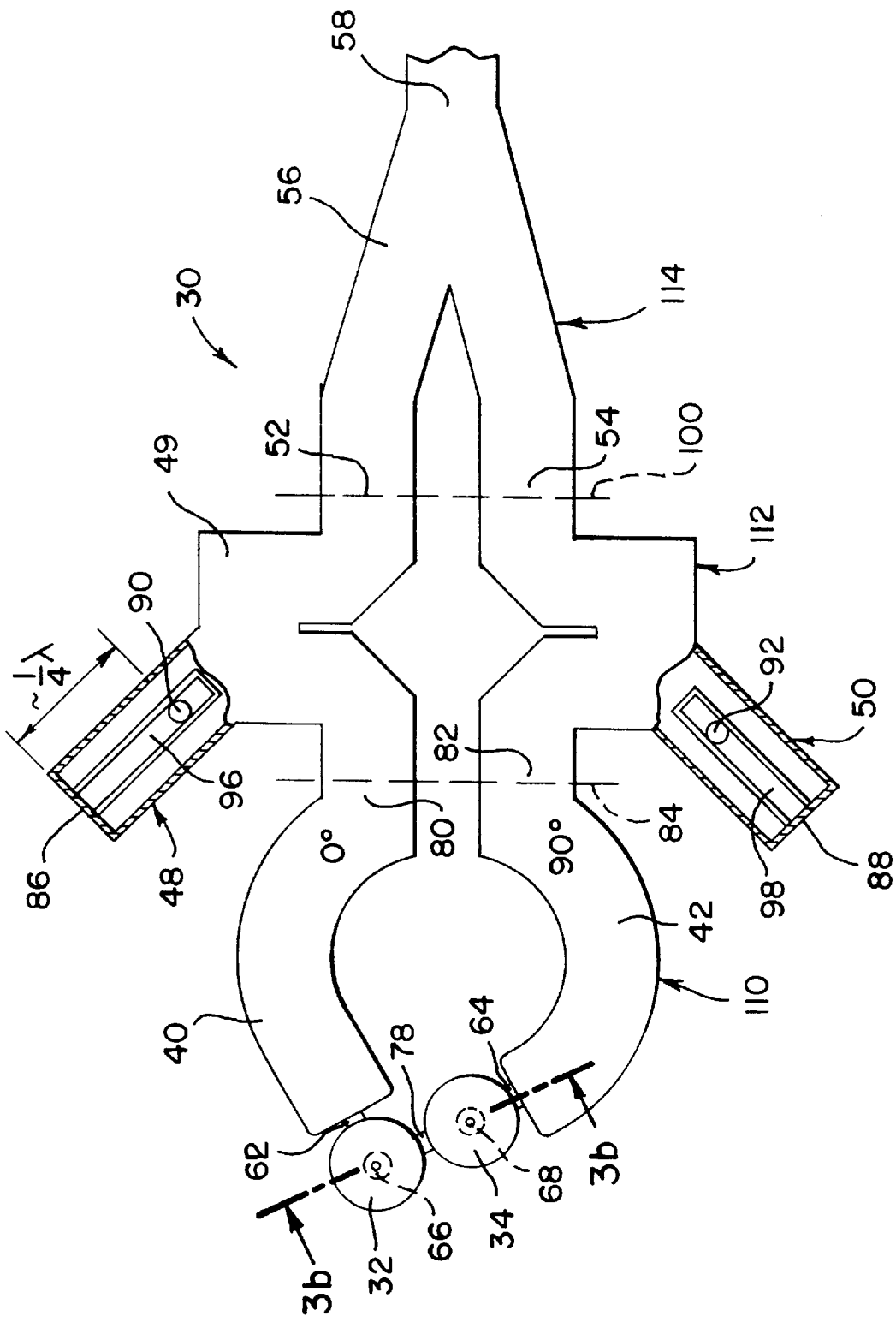
FIG. 3a is top cross-sectional view of one embodiment of the transmitter of FIG. 2.

Turning to FIG. 3a, there is shown a top cross-sectional view of one embodiment of the transmitter 30 of FIG. 2. According to the invention, the entire transmitter apparatus is provided as a waveguide structure having three primary elements: a quadrature vector source 110, a phase switching assembly 112, and an in-phase combiner 114, shown here separated by lines 84 and 100. Preferably, conventional waveguide, such as WR-28, and coupling aperture arrangements are utilized throughout.

The cavity oscillators 32, 34 are coupled to respective waveguides 40, 42 through coupling apertures 62, 64. The apertures 62, 64 are positioned on the oscillators 32, 34 so that the signals entering each of the waveguides 40, 42 are substantially 90 degrees out of phase with each other.

Preferably, the two cavity oscillators 32, 34 have a 0-1-0 cavity configuration which advantageously allows output signal vectors to be extracted at different points along the cavity to thereby provide different output signal phases. Thus, two cavities oscillating synchronously with each other can produce a pair of output vectors with any desired relative phase relationship. Because the phase of the output signal depends on the physical location of the extraction point, the phase relationship between the two signals remains substantially constant with changes in the oscillation frequency.

As shown in FIG. 3a, the circumferential position of the coupling aperture 62 between the first oscillator 32 and the waveguide 40 is substantially 90 degrees from the position of the coupling aperture 64 between the second oscillator 34 and the waveguide 42. In the preferred 0-1-0 cavity configuration, this arrangement provides the desired 90 degrees phase difference.

Figure 3B:
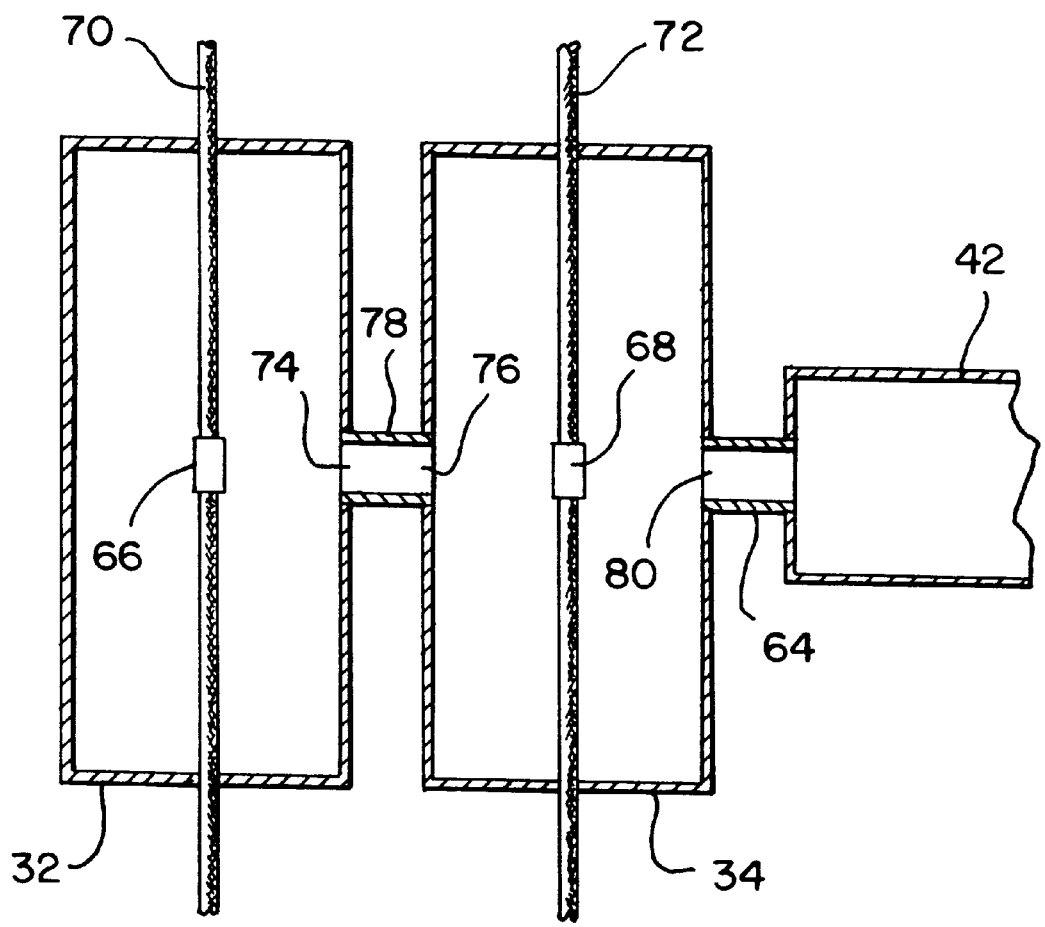
FIG. 3b is a cross-sectional view of the cavity oscillators along line 3B—3B.

A cross section of the cavity oscillators 32, 34 along line 3B—3B is shown in FIG. 3b. Each cavity oscillator 32, 34 contains a respective Gunn diode 66, 68 coaxially aligned with the axis of the respective oscillator cavities. DC power for the diodes 66, 68 is supplied through a coaxial cable 70, 72. The coaxial cable 70 is also used to provide the steering voltage signal 36 from the PLL 38 to the first oscillator 32. Each oscillator 32, 34 has a respective coupling slot 74, 76 which is connected to a coupling aperture 78 to connect the two oscillators 32, 34 as described above. Also shown in FIG. 3b is a coupling slot 80 in the second oscillator 34 which connects it to the waveguide 42.

Returning to FIG. 3a, each waveguide 40, 42 connects a respective oscillator 32, 34 to one of the bi-phase switches 48, 52. The length and configuration of each connecting waveguide 40, 42 is selected so that the phase difference between the two signals is preserved. In the preferred embodiment, the connecting waveguides 40, 42 are substantially mirror images of each other. This ensures that both waveguides 40, 42 will introduce the same phase shift, thus preserving the phase relationship, and will also have the same degree of attenuation, thereby keeping the signal strength balanced.

The signals received from the waveguides 40, 42 are preferably directed into the switching portions of the phase switches 48, 50 by reflective coupling structures 49, 51. These coupling structures 49, 51 are also configured to properly direct the phase-switched outputs 52, 54 from the switches 48, 50 into the in-phase combiner 56.

Each switch 48, 50 is preferably realized in a waveguide which terminates in a hard reflecting short 86, 88 and has a shorting diode 90, 92 placed in the signal path (shown extending into the plane). The diodes 90, 92 function as electrically variable shorts which act as switching points, effectively altering the length of the respective switch waveguide 48, 50 when they are conducting.

Ideally, a phase shift of 180 degrees is provided when the diodes are conducting and are placed one-quarter wavelength from the hard shorting plane. However, placing a diode in the waveguide introduces a parasitic capacitance which may alter the phase of the signal as it passes through the off-state diode while traveling to and from the hard short 86, 88. (When the diode is conducting, it functions as a short and the parasitic capacitance is of little concern). Because only a relative phase shift is required, the position of the diode is adjusted to compensate for the introduced phase shift.

Those skilled in the art will recognize that any type of mirrored waveguide switching arrangement may be utilized with the signal source discussed above and that various different waveguide structures may be used to provide the preferred hard and diode shorting points. In the embodiment shown in FIG. 3a, the impedance of the waveguide is lowered by adding ridges 96, 98. Preferably, a double-ridged waveguide configuration is used. This configuration focuses the magnetic field of the applied signal to directly impact the solid-state switch point which forms the shorting plane, increasing the efficiency of the switch.

As with the connecting waveguides 40, 42, the two switches 48, 50 are preferably substantially mirror images of each other. This ensures that any inherent phase shifts which are introduced by the switching structure are equally represented in both signals and therefore cancel out.

The (phase-shifted) output of the switches 40, 50 are applied to an in-phase combiner 56 to produce a QPSK output signal 58. Combining the output of the quadrature vectors in this manner advantageously provides a power-doubling effect in the combined signal with regards to signal amplitude without distortion.

Figure 4:
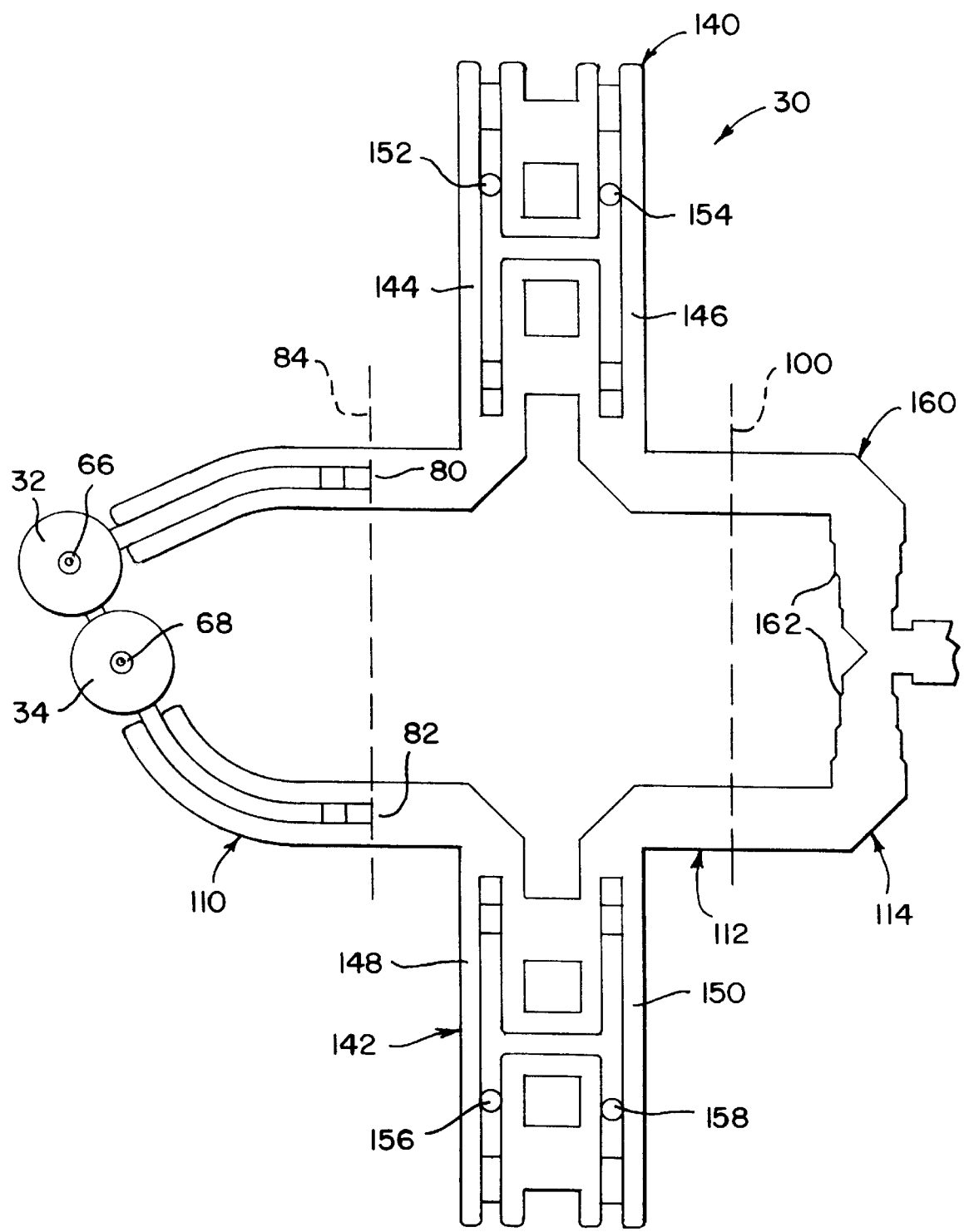
FIG. 4 is a top cross-sectional view of a second embodiment of the transmitter of FIG. 2.

An alternative, and more preferred arrangement of the transmitter 30 is shown in FIG. 4. The overall configuration is the same as shown in FIG. 3a. However, instead of using a single-point reflective switching structure as the bi-phase switch, quadrature switching structures 140, 142 are utilized. The switching waveguides 140, 142 are each comprised of two balanced waveguides 144, 146, 148, 150, each having its own switch point 152, 154, 156, 158. A balanced quadrature structure is more efficient than the single-point reflective structure of FIG. 3a. In addition, the use of two switch points isolates the switching and reduces interference.

An alternate configuration 160 for the in-phase combiner is also shown. This configuration has different reflection points than the combiner 56 shown in FIG. 3a and a lower signal loss. Also provided are steps 162 which may be used to match the impedance of the waveguide at the output to that of the transmit antenna structure.

Various modifications may be made to the transmitter structure described above without departing from the scope of the invention. For example, more than two oscillators may be slaved together and used to produce output vectors having phase relationships other than 90 degrees. Four oscillators may be provided and output signals selected to have phase relationships of 0, 45 degrees, 90 degrees, and 135 degrees respectively. Each output signal could then be supplied to a bi-phase switch as described above and the results merged with a 4-input bi-phase combiner to thereby allow four data bits to be simultaneously transmitted as an eight data-point constellation.

Additional pairs of switches which provide a phase shift other than 180 degrees may also be introduced to increase the data carrying capacity of the structure. For example, by placing the shorting diode(s) at approximately ⅛ wavelength from the hard short, a 45 degree phase shift may be selectively introduced. Adding a mirrored pair of these switches to the QPSK structure shown above allows an 8-point signal constellation to be produced. Alternatively, multiple short points may be introduced in a single switch to provide for several selectable phase shifts.

The oscillators 32, 34 and connecting waveguides 40, 42 may further be utilized as a signal source independent of the transmitter arrangement 30 described above. Thus, for example, a signal source 110 having outputs 80, 82 (along dividing line 84) can be provided without the remaining switching structure. By varying the point at which the oscillators 32, 34 are tapped and/or varying the configuration of the waveguides 40, 42, a dual-vector source can be produced with any desired phase relationship. Advantageously, the phase relationship remains substantially constant even as the frequency of oscillation is changed. Various applications for such a stable signal source will be apparent to those skilled in the art. For example, the power level of the oscillators may be modulated, the output polarized, and a combiner utilized to create a circularly polarized, amplitude modulated output signal for use in satellite and radar applications or the like.

While the invention has been particularly shown and described with reference to preferred embodiments thereof, it will be understood by those skilled in the art that various changes in form and details may be made therein without departing from the spirit and scope of the invention.

What is claimed is:

1. A signal generator for producing a plurality of signals having the same frequency but a constant phase difference suitable for use in a quadrature phase shift keying transmitter, said generator comprising:

first and second oscillators, each comprising a generally cylindrical cavity having an axially positioned signal source and respective first and second outer cylinder walls, each wall having an aperture therein;

a coupling aperture connected between the wall aperture in said first and second oscillators;

a first output signal being extracted from said first oscillator at a first predefined location on the first outer wall, the first predefined location defining a first angle relative to the wall aperture in said first oscillator;

a second output signal being extracted from said second oscillator at a second predefined location on the second outer wall, the second predefined location defining a second angle relative to the wall aperture in said first oscillator;

wherein the phase difference between said first and second output signals is dependent on the difference between said first and second angles.

2. The signal generator of claim 1, wherein each said signal source comprises a Gunn diode.

3. The signal generator of claim 1, wherein said first and second output signals are extracted by first and second waveguides connected to said first and second oscillators, respectively, at said first and second predefined locations.

4. The signal generator of claim 1, wherein the difference between said first and second angles is selected to be substantially 90 degrees.

5. The signal generator of claim 4, wherein said first angle is substantially 90 degrees and said second angle is substantially 180 degrees.

* * * * *